United States Patent Office 3,775,318
Patented Nov. 27, 1973

3,775,318
MIXTURES OF ALKALINE EARTH METAL FLUORIDES BONDED TO BEARING SURFACE WITH ALUMINUM PHOSPHATE
Melvin T. Lavik, Kansas City, George D. Moore, Raytown, and Ronald D. Hubbell, Kansas City, Mo., assignors to Midwest Research Institute, Kansas City, Mo.
No Drawing. Filed Feb. 25, 1970, Ser. No. 14,242
Int. Cl. C10m 7/02
U.S. Cl. 252—12                               16 Claims

ABSTRACT OF THE DISCLOSURE

A high temperature lubricant composition comprises an admixture of a monoaluminum phosphate binder and two or more particulate alkaline earth metal fluoride lubricant pigments dispersed in the binder and present preferably in approximately a eutectic ratio. To form a lubricating film on a bearing surface, the composition is prepared by mixing the pigments in an aqueous solution of the binder and is then applied as a coating to the surface. After precuring at a relatively low temperature to eliminate moisture, a final cure is effected by heating the coating in an evacuated environment to a temperature approaching the melting point thereof in order to diffuse the coating and form a film that is tightly adhered to the surface.

This invention relates to improvements in high temperature inorganic bonded solid lubricants.

Special consideration must be given to the type of lubricant utilized with bearings in equipment such as jet aircraft engines, industrial furnaces, and re-entry vehicles. Besides the obvious problem of selecting a lubricant which will withstand the high temperatures involved, the problem is compounded by the fact that the environment in which the bearings must operate may comprise an oxidizing or reducing atmosphere, or a partial or complete vacuum in high altitude and space applications.

In most instances the upper limit of the operating temperature range is on the order of 1200° to 1500° F. Various high temperature alloys, for example, may be utilized as the base bearing material. The temperature requirement suggests inorganic bonded solid lubricants as a possible choice, applied to the base as a film adhered to the bearing surface. However, although inorganic film lubricants have been proposed having at least a theoretical operating temperature capability on the order of 2000° F., the curing temperature of such lubricants is correspondingly quite high and may exceed the temperature which the base material can withstand without suffering degradation of its load carrying properties.

It is, therefore, an important object of the present invention to provide a solid film lubricant capable of efficient operation in high temperature applications, but which may be formed as a film and bonded to the base bearing material at a temperature not significantly higher than the desired upper limit of the operating temperature range, thereby precluding thermal degradation of the base and providing greater freedom and flexibility in the selection of a suitable base material for a particular application.

Another important object of the invention is to provide a lubricant as aforesaid in which the curing temperature thereof and the upper limit of its operating temperature range may be selected as desired for a particular application by proper proportioning of the binder and lubricant pigments, in order to hold the curing temperature to a level compatible with the upper limit of the operating temperature range and, therefore, compatible with the base from the standpoint of avoiding thermal degradation thereof.

Still another important object of the invention is to provide a lubricant composition for application as a coating to a base, wherein such composition comprises an admixture of a binder and two or more particulate alkaline earth metal fluoride lubricant pigments dispersed in the binder and present in a ratio that significantly lowers the melting point of the admixture as compared with the individual melting points of the pigments, in order to lower the curing temperature of the coating to a level which will provide the required operating temperature range without causing thermal degradation of the base.

Yet another important object of the invention is to provide a solid film lubricant as aforesaid having a ratio of such fluoride pigments therein which is approximately the eutectic ratio thereof to thereby, in conjunction with the binder, minimize the curing temperature of the applied coating.

A further and important object of the invention is to provide a binder composed of monoaluminum phosphate for use with the above fluoride pigments, in order to decrease the friction coefficient and substantially increase the wear life of the lubricant in the high temperature operating range thereof.

Additionally, it is an important aim of this invention to provide a solid lubricant as set forth in the foregoing objects which may be utilized with bearings that operate in an oxidizing, reducing, or vacuum environment.

Specifically, the present invention utilizes monoalumium phosphate as a binder in an inorganic solid lubricant. The lubricant pigments comprise two or more alkaline earth metal fluorides in finely divided form, such as magnesium fluoride ($MgF_2$), calcium fluoride ($CaF_2$), strontium fluoride ($SrF_2$), and barium fluoride ($BaF_2$). The composition is initially prepared as an admixture of the selected pigments in an aqueous solution of monoaluminum phosphate, and is ultimately coated on the base and cured to form a film lubricant. Preferably, the pigments are present in approximately their eutectic ratio in order to minimize the curing temperature.

Preparation of the lubricant composition will be described with reference to a preferred example utilizing $CaF_2$ and $BaF_2$ as the lubricant pigments. Each of the pigments is in finely divided form, such as a 200 mesh powder, and is added to an aqueous solution of monoaluminum phosphate. The ratio by weight of $BaF_2$ to $CaF_2$ is approximately 1.6:1, the monoaluminum phosphate content by weight being in the range of approximately 3% to 5% of the total dry solids. A specific example of an optimum formulation, expressed in weight percent of dry solids, is as follows:

|  | Percent |
| --- | --- |
| $CaF_2$ | 36.5 |
| $BaF_2$ | 59.6 |
| Binder | 3.9 |

Sufficient distilled water is added to the admixture to render the same suitable for spraying by an airbrush onto the base to be coated. Thorough mechanical mixing utilizing a blender or other suitable means is required in order to assure that the particulate pigments are uniformly dispersed throughout the solution, since $CaF_2$ and $BaF_2$ are only slightly soluble in water. The base surface is prepared by imparting a uniform roughness thereto, such as by grit blasting. The base is then cleaned with a suitable detergent and rinsed with an appropriate solvent. Preferably, the base is preheated to approximately 130° F. prior to being sprayed with the coating composition.

After the coating is applied, precuring at temperatures ranging from 205° to 570° F. is effected for several hours in a furnace under ambient atmospheric conditions. The primary purpose of the precure is to evaporate moisture from the coating. However, it has been found that the lubricant coating of the present invention partially bonds to the bearing surface when air-dried, thereby rendering bearings with uncured coatings easy to handle. This advantageous characteristic appears to result from the presence of the monoaluminum phosphate.

The final cure may be effected in an evacuated environment, such as a RF vacuum chamber at approximately $10^{-3}$ torr. Heat is applied until the coating reaches the curing temperature, whereupon the coated bearings are then permitted to at least partially cool in the vacuum before being returned to the ambient environment. Inert gas or air at atmospheric pressure may also be used as the curing environment, depending on the composition of the base material. For the above 1.6:1 ratio of $BaF_2$ to $CaF_2$ and an increased satisfactory range of binder content to be discussed hereinafter, the optimum curing temperature is approximately 950° C. (1740° F.) with highly satisfactory results being obtainable with the curing temperature in the range of approximately 900° to 950° C. (1650° to 1740° F.).

Additionally, utilizing the 1.6:1 ratio of $BaF_2$ to $CaF_2$, satisfactory lubricant films are obtained with a monoaluminum phosphate content in the range of approximately 2 to 9 weight percent of dry solids. As will be appreciated from actual test data to be set forth hereinafter, varying the binder content has an effect on both the wear life and the friction coefficient of the film. In particular, the wear life is greatly enhanced by holding the binder content within the more restricted, preferred range set forth hereinabove (3 to 5 weight percent), with maximization of the wear life being a characteristic of the aforesaid optimum formulation.

The upper limit of the operating temperature range of any of the films of the present invention is determined by the curing temperature which, in turn, approaches the melting point of the admixture of binder and pigments. As the temperature of the coating is increased during curing, it is believed that diffusion of atoms and molecules between the pigment particles causes the two fluorides to form a eutectic mixture, or approximately a eutectic depending on the selected ratio of the constituents. The monoaluminum phosphate also interacts with the pigments to effect a somewhat additional reduction in melting point. By way of illustration, the melting point of $CaF_2$ alone is 1360° C., and $BaF_2$ alone is 1280° C. However, the foregoing formulations (1.6:1 ratio) have a melting point on the order of 1000° C., the exact temperature being dependent upon the particular amount of monoaluminum phosphate employed. Thus, the upper operating limit of the above film employing $CaF_2$ and $BaF_2$ for sustained operation is approximately 1600° F. (870° C.).

For somewhat lower temperature applications, the addition of $MgF_2$ to the $CaF_2$ and $BaF_2$ pigments is advantageous, in that a eutectic action occurs among the constituents to further lower the melting point of the film, and hence the temperature at which the coating must be cured to diffuse the coating and form the lubricant film. A preferred ratio by weight of $BaF_2$ to $CaF_2$ to $MgF_2$ is approximately 6:1.5:1, with the monoaluminum phosphate being present in the range of approximately 3 to 5 weight percent of dry solids. A specific example of a precise formulation, expressed in weight percent of dry solids, is as follows:

|  | Percent |
|---|---|
| $MgF_2$ | 11.2 |
| $CaF_2$ | 16.5 |
| $BaF_2$ | 68.5 |
| Binder | 3.8 |

The optimum curing temperature is 750° C. (1380° F.), with satisfactory results being obtained utilizing a curing temperature of from 750° to 800° C. (1380° to 1470° F.). The most satisfactory operating temperatures range from 500° to 1200° F., in contrast to a range of from 800° to 1400° F. for the previous film formulation without $MgF_2$. Thus, in applications where operating temperatures will not exceed 1200° F. and enhanced lower temperature performance is desired, the three pigment formulation is advantageous due to the extended lower operating range and the fact that a curing temperature of only 750° C. is required in contrast to the 900° to 950° C. curing temperature range of the film employing $CaF_2$ and $BaF_2$ exclusively as the lubricant pigments.

Another film formulation for somewhat lower temperature applications utilizes a combination of four pigments, $MgF_2$, $CaF_2$, $SrF_2$, and $BaF_2$. The melting point of $SrF_2$ is only 1190° C. as compared with the significantly higher melting points of $CaF_2$ and $BaF_2$ set forth above and the melting point of $MgF_2$, which is 1396° C. Thus, further minimization of the curing temperature of the film is realized by the addition of $SrF_2$ to the three higher melting point pigments.

Although 500° C. and 800 C. are referred to above as the lower limits of the most satisfactory operating temperature ranges for the respective three pigment and two pigment formulations, it is to be understood that these films, as well as other film formulations set forth herein, are usable at lower temperatures with a sacrifice in wear life and/or friction coefficient. Enhancement of wear and friction performance at lower temperatures may be attained, however, through the employment of additives such as graphite, silver, and gold in powdered form. Furthermore, in the three pigment film employing $MgF_2$, $CaF_2$, and $BaF_2$, powdered molybdenum disulfide ($MoS_2$) and tungsten disulfide ($WS_2$) may also be used as low temperature additives. The selected additive is admixed with the fluoride pigment powders and the aqueous solution of monoaluminum phosphate and preparation of the composition is as described hereinabove. Generally speaking, the amount of the additive will be restricted to less than approximately 50% by weight of the total dry solids, and frequently approximately 10%. Such additive containing films have useful operating ranges from room temperature to 1000° or 1200° F.

Other two-component pigments include any fluoride pair selected from $MgF_2$, $CaF_2$, $SrF_2$, and $BaF_2$. For example, eutectic or nearly eutectic ratios of $BaF_2$ to $MgF_2$ are formed by 40 to 55 molecular percent $BaF_2$ admixed with 60 to 45 molecular percent $MgF_2$ respectively. The range of melting points for the $BaF_2$ and $MgF_2$ combinations per se is approximately 910° to 940° C., with the lowest melting temperature resulting from the 40:60 molecular percent ratio of $BaF_2$ to $MgF_2$. For a combination of $MgF_2$ and $CaF_2$, the eutectic ratio is approximately 40 molecular percent $MgF_2$ to 60 molecular percent $CaF_2$, with the resulting melting point of the two fluorides alone being approximately 950° C. It should be understood that the term "molecular percent" refers to the number of molecules of a given constituent expressed as a percentage of the total number of molecules of the combination. See The Phase Diagrams for Ceramists, 1969 Supplement, Figure 3450, published by the American Ceramic Society.

Further examples of two-component pigments include $CaF_2$ and $SrF_2$, and $SrF_2$ and $BaF_2$. As mentioned above, the melting point of $SrF_2$ is only 1190° C. as compared with the significantly higher melting points of $MgF_2$, $CaF_2$, and $BaF_2$. It may be appreciated, therefore, that $SrF_2$ may be advantageously combined with one or more of the other fluorides in high temperature lubricant applications where minimization of the curing temperature of the film is an important consideration.

The table hereinbelow comprises wear life and friction coefficient test data on seven films (series 1 through 7) containing a two-component pigment of $CaF_2$ and $BaF_2$, and one film (series 10) composed of $MgF_2$, $CaF_2$, $BaF_2$, and monoaluminum phosphate (binder) in the specific exemplary formulation set forth above. The tester utilized was a dual rub shoe machine employing a specimen configuration consisting of two opposed ¼ in. wide rub shoes loaded against a 1⅜ in. diameter rotating disk forming the base to which the film was bonded. The tester has heaters for the rub shoes in the holders therefor, and a heater arranged to apply heat to the disk shaft for conduction to the specimen film. The rub shoes were made of René 41 and the substrate disks for the specimen films were rhodium-plated René 41.

The frictional torque was measured in terms of the reaction torque on the drive motor. A dead-weight calibration of the torque sensing system was run prior to each test. During each test, the measured torque was plotted vs. time. A microswitch, mounted on a chart recorder, was positioned so as to terminate each test when the friction coefficient reached 0.20 (calculated for a 100-lb. load on each rub shoe). By this technique the tests were terminated when the recorded friction coefficients exceeded 0.20, even though the average coefficient was lower.

The test temperature was monitored by a thermocouple in contact with the test disk (in a circuit which controlled the shaft heater) and by a thermocouple in contact with one rub shoe (in a circuit which controlled the heaters in the rub shoe holders). The load, applied through the dead-weight leverage system, was calibrated with a force gauge at the position of contact between the test disk and rub shoe. The test speed was calibrated with both a strobe light and a tachometer. The table setting forth the test data follows, together with test conditions and film formulations:

WEAR LIFE AND FRICTION DATA

| Film series and No. | Film thickness (mils) | Film mass (mg.) | Wear life (thousands of loading cycles) | Friction coefficient 10% | Friction coefficient 50% | Friction coefficient 90% |
|---|---|---|---|---|---|---|
| 1-1 | 0.4 | 14.6 | 21 | 0.145 | 0.159 | 0.172 |
| 1-2 | 0.2 | 10.4 | 180 | 0.080 | 0.101 | 0.112 |
| 1-3 | 0.4 | 8.9 | 35 | 0.094 | 0.115 | 0.140 |
| 2-1 | 0.6 | 44.0 | 85 | 0.118 | 0.135 | 0.168 |
| 2-2 | 0.5 | 35.4 | 125 | 0.106 | 0.119 | 0.172 |
| 2-3 | 0.3 | 33.0 | 92 | 0.095 | 0.119 | 0.156 |
| 3-1 | 0.7 | 45.0 | 720 | 0.088 | 0.110 | 0.105 |
| 3-2 | 0.5 | 46.6 | 322 | 0.101 | 0.110 | 0.130 |
| 3-3 | 0.9 | 50.8 | 84.6 | 0.096 | 0.122 | 0.170 |
| 4-1 | 0.8 | 66.1 | 468 | 0.110 | 0.110 | 0.105 |
| 4-2 | 0.7 | 56.8 | 1,033 | 0.095 | 0.100 | 0.098 |
| 4-3 | 0.7 | 52.5 | 776 | 0.106 | 0.115 | 0.110 |
| 5-1 | 1.0 | 107.2 | 551 | 0.107 | 0.095 | 0.094 |
| 5-2 | 0.7 | 90.1 | 584 | 0.102 | 0.125 | 0.137 |
| 5-3 | 0.8 | 94.5 | 734 | 0.095 | 0.120 | 0.126 |
| 6-1 | 0.6 |  | 293.9 | 0.09 | 0.11 | 0.14 |
| 6-2 | 0.3 |  | 348.2 | 0.10 | 0.11 | 0.15 |
| 6-3 | 0.3 |  | 286.5 | 0.08 | 0.10 | 0.15 |
| 7-1 |  |  | 285.0 | 0.10 | 0.14 | 0.15 |
| 7-2 |  |  | 275.0 | 0.08 | 0.10 | 0.12 |
| 7-3 |  |  | 291.0 | 0.09 | 0.11 | 0.13 |
| 7-4 |  |  | 205.0 | 0.08 | 0.10 | 0.10 |
| 7-5 |  |  | 327.0 | 0.09 | 0.11 | 0.15 |
| 7-6 |  |  | 121.0 | 0.10 | 0.10 | 0.13 |
| 7-7 |  |  | 170.0 | 0.10 | 0.10 | 0.12 |
| 7-8 |  |  | 121.0 | 0.09 | 0.09 | 0.13 |
| 7-9 |  |  | 177.0 | 0.09 | 0.09 | 0.12 |
| 10-1 |  |  | 338.5 | 0.056 | 0.052 | 0.064 |
| 10-2 | 1.0 | 52.7 | 249.9 | 0.066 | 0.058 | 0.064 |
| 10-3 | 0.7 | 57.8 | ¹ 258.0 | 0.070 | 0.075 | 0.080 |
| 10-4 |  |  | 105.6 | 0.050 | 0.090 | 0.088 |
| 10-5 |  |  | 180.1 | 0.080 | 0.084 | 0.102 |
| 10-6 | 1.1 | 57.5 | ¹ 304.0 | 0.045 | 0.105 | 0.090 |

¹ Over.

The tests from which the above data were collected were run with a 100 lb. load on each rub shoe, and in an air environment at a pressure of 760 torr. The speed of the disk was 500 r.p.m. (18 f.p.m.), resulting in 1,000 loading cycles per minute. Throughout the runs, the temperature of the films was maintained at 1000° F. (540° C.). The wear lives are with the friction coefficient less than 0.2, since each test was terminated when the friction coefficient reached 0.20 as mentioned hereinabove. The friction coefficients are given at 10, 50 and 90 percent of such film life. An exception to this is film 7-1, the friction cutoff for this test having been set at a coefficient of 0.17.

Additionally, films 10-3 and 10-6 were tested with a loading of 50 lbs. on each rub shoe, rather than 100 lbs. Films 10-1, 10-4, and 10-5 were run at a 50 lb. load for 30 minutes prior to the actual test recorded above at 100 lb. load. Film 10-2 was run at a 50 lb. load for 51.3 minutes prior to the above test.

In the series 1 through 7 films, the ratio by weight of $BaF_2$ to $CaF_2$ was 1.63:1. The aluminum phosphate content, expressed in weight percent of dry solids, was as follows:

|  | Percent |
|---|---|
| Series 1 | None |
| Series 2 | 2.0 |
| Series 3 | 3.0 |
| Series 4 | 3.9 |
| Series 5 | 4.8 |
| Series 6 | 5.7 |
| Series 7 | 7.2 |

All of the films were precured one hour at 205° F., one hour at 390° F., and one hour at 570° F. in an air atmosphere furnace. The surface finish of the substrate disks was generally in the range from 20 to 50 $\mu$in. RMS as measured with a commercial profilometer.

All of the films of series 1 through 7 were cured (final cure) at a temperature of 950° C. (1740° F.). Films 10-1, 10-2, and 10-3 were cured at 750° C. (1380° F.), and films 10-4, 10-5, and 10-6 were cured at 800° C. (1470° F.).

The data set forth in the above table, together with the results of other tests and evaluations of these films, reveal that the films have the following properties and capabilities:

(1) Wear life exceeding 10 hr. at 1000° F., 180 f.p.m., 100-lb. load on a dual rub shoe tester.

(2) Friction coefficients below 0.12 from 1000° to 1300° F. and higher.

(3) The property of withstanding the thermal shock of cooling rapidly after reaching the final cure temperature.

(4) The capability of tolerating interruption in the wear life tests, cooling to room temperature, and reheating to test temperature (i.e., 1000° F.) for further testing without degrading the film performance.

(5) The property of nearly equivalent wear lives and friction coefficients at elevated temperatures (800° to 1300° F.) in both air and vacuum ($10^{-6}$ torr) environments.

(6) The capability of functioning effectively over wide ranges of temperature, load, speed, and gas environment.

Having thus described the invention, what is claimed as new and desired to be secured by Letters Patent is:

1. An adherent, solid lubricant film for a bearing surface, said film comprising the resultant of the interaction of monoaluminum phosphate and particulate lubricant pigments dispersed in an admixture thereof which is coated on said surface and cured at an elevated temperature approaching the melting point of the admixture, said monoaluminum phosphate being present in said admixture in an amount by weight in the range of approximately 2% to 9% of the total dry weight of the monoaluminum phosphate and pigments, and said pigments being two or more alkaline earth metal fluorides present in said admixture in sufficient respective quantities to significantly lower said melting point as compared with the individual melting points of the pigments.

2. An adherent, solid lubricant film for a bearing surface, said film comprising the resultant of the interaction of monoaluminum phosphate and particulate $BaF_2$ and $CaF_2$ dispersed in an admixture thereof which is coated on said surface and cured at a temperature in the range of approximately 900° to 950° C., said monoaluminum phosphate being present in said admixture in an amount by weight in the range of approximately 2% to 9% of the total dry weight of the monoaluminum phosphate, $BaF_2$, and $CaF_2$, and said $BaF_2$ and $CaF_2$ being present in said admixture in the ratio by weight of $BaF_2$ to $CaF_2$ of approximately 1.6:1.

3. An adherent, solid lubricant film for a bearing surface, said film comprising the resultant of the interaction of monoaluminum phosphate and particulate $BaF_2$, $CaF_2$, and $MgF_2$ dispersed in an admixture thereof which is coated on said surface and cured at a temperature in the range of approximately 750° to 800° C., said monoaluminum phosphate being present in said admixture in an amount by weight in the range of approximately 3% to 5% of the total dry weight of the monoaluminum phosphate, $BaF_2$, $CaF_2$, and $MgF_2$, and said $BaF_2$, $CaF_2$, and $MgF_2$ being present in said admixture in the ratio by weight of $BaF_2$ to $CaF_2$ to $MgF_2$ of approximately 6:1.5:1.

4. The solid lubricant film as claimed in claim 1, wherein two of said pigments are $CaF_2$ and $BaF_2$.

5. The solid lubricant film as claimed in claim 4, wherein the ratio by weight of $BaF_2$ to $CaF_2$ in said admixture is approximately 1.6:1.

6. The solid lubricant film as claimed in claim 4, wherein the amount by weight of said monoaluminum phosphate in said admixture is in the range of approximately 3% to 5% of the total dry weight of said binder, $CaF_2$, and $BaF_2$.

7. The solid lubricant film as claimed in claim 4, wherein another of said pigments is $MgF_2$.

8. The solid lubricant film as claimed in claim 7, wherein the amount by weight of said monoaluminum phosphate in said admixture is in the range of approximately 3% to 5% of the total dry weight of said binder, $MgF_2$, $CaF_2$, and $BaF_2$.

9. The solid lubricant film as claimed in claim 8, wherein the ratio by weight of $BaF_2$ to $CaF_2$ to $MgF_2$ in said admixture is approximately 6:1.5:1.

10. The solid lubricant film as claimed in claim 7, further comprising a minor effective amount of a relatively low temperature, particulate lubricating substance added to said admixture and selected from the group consisting of $MoS_2$ and $WS_2$.

11. The solid lubricant film as claimed in claim 7, wherein an additional pigment is $SrF_2$.

12. The solid lubricant film as claimed in claim 1, wherein two of said pigments are $MgF_2$ and $CaF_2$.

13. The solid lubricant film as claimed in claim 1, wherein two of said pigments are $MgF_2$ and $BaF_2$.

14. The solid lubricant film as claimed in claim 1, wherein two of said pigments are $CaF_2$ and $SrF_2$.

15. The solid lubricant film as claimed in claim 1, wherein two of said pigments are $SrF_2$ and $BaF_2$.

16. The solid lubricant film as claimed in claim 1, further comprising a minor effective amount of a relatively low temperature, particulate lubricating substance added to said admixture and selected from the group consisting of graphite, silver, and gold.

References Cited

UNITED STATES PATENTS

| | | | |
|---|---|---|---|
| 3,297,571 | 1/1967 | Bonis | 252—25 |
| 3,301,781 | 1/1967 | Rice et al. | 252—25 |
| 3,419,363 | 12/1968 | Sliney | 252—25 |
| 3,429,720 | 2/1969 | Houston et al. | 252—25 |
| 3,242,076 | 3/1966 | Hagan | 252—12 |
| 3,361,666 | 1/1968 | Gaddis et al. | 252—12 |
| 3,467,596 | 9/1969 | Hermann | 252—12 |

FOREIGN PATENTS

| | | | |
|---|---|---|---|
| 913,175 | 12/1962 | Great Britain | 252—12 |

OTHER REFERENCES

"Bonded Coatings Lubricate Metal Parts," by Disapio in Product Engineering, Sept. 5, 1960, pp. 48–53.

U.S. Cl. X.R.

252—25

I. VAUGHN, Assistant Examiner

DANIEL E. WYMAN, Primary Examiner